(12) United States Patent
Slinger et al.

(10) Patent No.: US 12,287,718 B2
(45) Date of Patent: Apr. 29, 2025

(54) SHORT-TERM MODEL CALIBRATION IN SYSTEM MONITORING

(71) Applicant: BMC Software, Inc., Houston, TX (US)

(72) Inventors: Nigel Slinger, Los Gatos, CA (US); Wenjie Zhu, Dublin (IE); Catherine Drummond, Morgan Hill, CA (US); Sudipta Sengupta, Richmond, TX (US)

(73) Assignee: BMC Software, Inc., Houston, TX (US)

(*) Notice: Subject to any disclaimer, the term of this patent is extended or adjusted under 35 U.S.C. 154(b) by 1070 days.

(21) Appl. No.: 17/301,143

(22) Filed: Mar. 26, 2021

(65) Prior Publication Data

US 2022/0308977 A1    Sep. 29, 2022

(51) Int. Cl.
*G06F 11/34* (2006.01)
*G06N 20/00* (2019.01)
*G06Q 10/0639* (2023.01)

(52) U.S. Cl.
CPC ......... *G06F 11/3428* (2013.01); *G06N 20/00* (2019.01); *G06Q 10/0639* (2013.01)

(58) Field of Classification Search
CPC .............. G06F 11/3409; G06F 11/1138; G06F 11/0754
See application file for complete search history.

(56) References Cited

U.S. PATENT DOCUMENTS

| 10,200,262 | B1 | 2/2019 | Leverich et al. |
| 11,526,400 | B2* | 12/2022 | Slinger ............... G06F 11/1438 |
| 11,675,687 | B2* | 6/2023 | Kumar ................ G06F 11/0754 714/26 |
| 2015/0046757 | A1* | 2/2015 | Brew .................. G06F 11/3409 714/47.3 |
| 2018/0219889 | A1 | 8/2018 | Oliner et al. |

OTHER PUBLICATIONS

Extended European Search Report for European Application No. 21177730.5, mailed Nov. 12, 2021, 8 pages.

* cited by examiner

*Primary Examiner* — Lam S Nguyen
(74) *Attorney, Agent, or Firm* — Brake Hughes Bellermann LLP

(57) ABSTRACT

A technology landscape may be characterized using a performance characterization that includes scores assigned to performance metrics for the technology landscape and using at least one trained machine learning model. In response to a detected calibration trigger, a calibratable performance metric of the performance metrics may be determined. A relationship may be determined between conforming values of the calibratable performance metric during a conforming period for which the at least one trained machine learning model was trained, and non-conforming values of the calibratable performance metric occurring during a calibration period initiated by the calibration trigger. In this way, a score assigned to the calibratable performance metric may be calibrated, based on the relationship.

20 Claims, 7 Drawing Sheets

SHORT-TERM MODEL CALIBRATION IN SYSTEM MONITORING

TECHNICAL FIELD

This description relates to system monitoring.

BACKGROUND

Many companies and other entities have extensive technology landscapes that include numerous Information Technology (IT) assets, including hardware and software. It is often required for such assets to perform at high levels of speed and reliability, while still operating in an efficient manner. For example, various types of computer systems are used by many entities to execute mission critical applications and high volumes of data processing, across many different workstations and peripherals.

Various types of system monitoring method are used to detect, predict, prevent, mitigate, or cure system faults that might otherwise disrupt or prevent monitored assets from achieving system goals. For example, it is possible to monitor various types of performance metrics characterizing aspects of system performance. When monitored values of the detected performance metrics are scored as being outside of a predetermined range, the monitored values may be considered potentially indicative of a current or future system malfunction, and appropriate action may be taken.

For example, scoring of performance metrics may be performed using machine learning models that are trained using historical data. In other words, such historical data may be used to discern long-term patterns and characteristics that enable accurate assessments of current performance levels and predictions of future performance levels.

In many short-term scenarios, however, such techniques are often inapplicable. For example, there may be no or insufficient historical data available that would be useful for training purposes. Consequently, it may be necessary to cease use of trained models for scoring during such short-term scenarios. However, events occurring during such short-term scenarios may be critical for an underlying mission of the technology landscape.

SUMMARY

According to one general aspect, a computer program product may be tangibly embodied on a non-transitory computer-readable storage medium and may include instructions that, when executed by at least one computing device, are configured to cause the at least one computing device to detect a calibration trigger for a technology landscape. The technology landscape may be characterized using a performance characterization that includes scores assigned to performance metrics for the technology landscape and using at least one trained machine learning model. In response to the calibration trigger, a calibratable performance metric of the performance metrics may be determined. A relationship may be determined between conforming values of the calibratable performance metric during a conforming period for which the at least one trained machine learning model was trained, and non-conforming values of the calibratable performance metric occurring during a calibration period initiated by the calibration trigger. A score assigned to the calibratable performance metric by the at least one trained machine learning model during the calibration period may be calibrated, based on the relationship, to thereby obtain a calibrated score for inclusion in the performance characterization.

According to another general aspect, a computer-implemented method includes detecting a calibration trigger for a technology landscape, the technology landscape being characterized using a performance characterization that includes scores assigned to performance metrics for the technology landscape and using at least one trained machine learning model. The method may further include determining, in response to the calibration trigger, a calibratable performance metric of the performance metrics, and determining a relationship between conforming values of the calibratable performance metric during a conforming period for which the at least one trained machine learning model was trained, and non-conforming values of the calibratable performance metric occurring during a calibration period initiated by the calibration trigger. The method may further include calibrating a score assigned to the calibratable performance metric by the at least one trained machine learning model during the calibration period, based on the relationship, to thereby obtain a calibrated score for inclusion in the performance characterization.

According to another general aspect, a system may include at least one memory including instructions, and at least one processor that is operably coupled to the at least one memory and that is arranged and configured to execute instructions. When executed, the instructions cause the at least one processor to detect a calibration trigger for a technology landscape, the technology landscape being characterized using a performance characterization that includes scores assigned to performance metrics for the technology landscape and using at least one trained machine learning model. When executed, the instructions cause the at least one processor to determine, in response to the calibration trigger, a calibratable performance metric of the performance metrics, and determine a relationship between conforming values of the calibratable performance metric during a conforming period for which the at least one trained machine learning model was trained, and non-conforming values of the calibratable performance metric occurring during a calibration period initiated by the calibration trigger. When executed, the instructions cause the at least one processor to calibrate a score assigned to the calibratable performance metric by the at least one trained machine learning model during the calibration period, based on the relationship, to thereby obtain a calibrated score for inclusion in the performance characterization.

The details of one or more implementations are set forth in the accompanying drawings and the description below. Other features will be apparent from the description and drawings, and from the claims.

DETAILED DESCRIPTION

Figure 1:
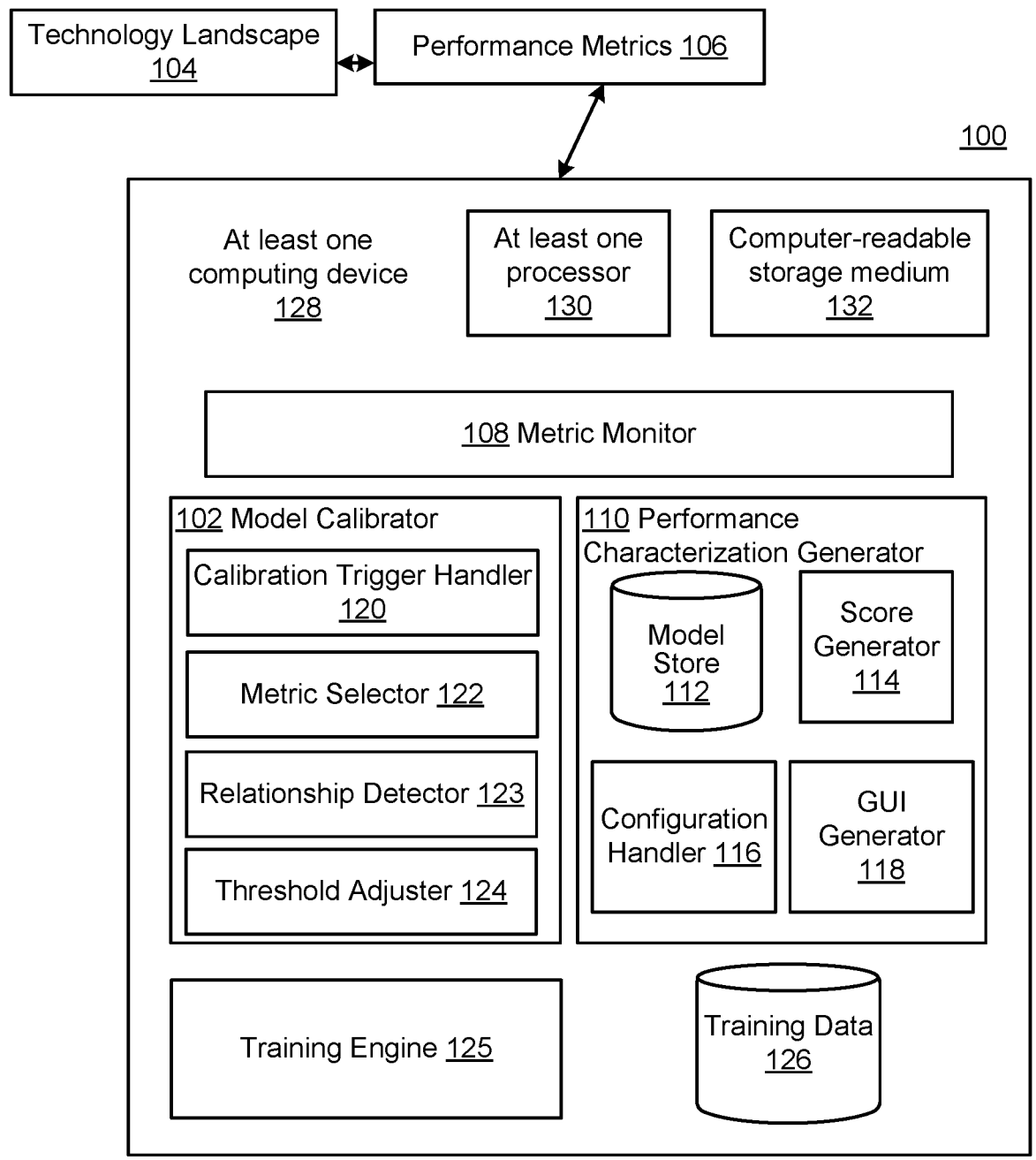
FIG. 1 is a block diagram of a monitoring system with short-term model calibration.

Described systems and techniques provide actionable insights to enable reliable operations across a technology landscape, even during short-term time periods for which model training is not fully available. Such insights include, e.g., detection and characterizations of the nature, location, and timing of an existing or potential anomaly, as well as a severity or trend of such an anomaly. Accordingly, with such insights, anomalies may be avoided or resolved in a minimal time period, with minimal effect, and with minimal knowledge, training, and effort required of a system administrator. With such insights, potential anomalies may be predicted and false positives reduced.

In providing the above features and advantages, described systems and techniques enable fast and accurate calibration of a trained machine learning model, without requiring additional training thereof. For example, during a calibration period defined with respect to a short-term usage scenario of a technology landscape, a trained machine learning model may be dynamically and continuously calibrated in response to current performance metric values and associated scores. The dynamic calibration may be based on known performance metric values and/or associated scores from a conforming period of time for which the trained machine learning model was trained.

In other words, a conforming period, as used herein, refers generally to a period of time during which historical usage patterns are considered or expected to apply, and where such historical usage patterns were used to train at least one machine learning model used to assign scores to relevant performance metric values. A calibration period, in contrast, refers to a period of time during which the at least one machine learning model is not expected to provide accurate scoring results, without, e.g. the types of dynamic calibration described herein.

In specific examples described herein, a calibration period may include, or be referred to as, a calibration date, or a 'special day' during which operations of a technology landscape are heavily affected by a calendar event, such as a holiday. In particular, for example, Black Friday refers to the day following Thanksgiving in the United States, which is historically known for high volumes of shopping.

Although historically known to occur, actual shopping volumes and characteristics may be difficult or impossible to predict for a particular business in a particular year. As a result, it is correspondingly difficult or impossible for a business to allocate resources in an accurate manner.

For example, a business conducting online sales may experience high volumes of website traffic, including high volumes of purchases being made. If system monitoring is inaccurate or unavailable, and resource allocation correspondingly suffers, then the business may suffer lost sales and customer dissatisfaction. Moreover, such special days may account disproportionately for an overall success of the business, as a larger-than-normal percentage of sales may typically occur on such days.

Nonetheless, conventional techniques are unable to use trained machine learning models during such special days. Instead, businesses may attempt to estimate or guess technology landscape characteristics and performance metric values that might occur on the special day (e.g., based on similar, previously-occurring special days), or may be forced to entirely ignore the scoring of trained machine learning models until the special day has ended.

In contrast, the techniques described herein identify and utilize performance metrics associate with workloads and program logic that are identified as being proportional by nature with (or otherwise mathematically related to) usage of associated elements of a technology landscape. Then, during a calibration period, such as during a special day, a machine learning model trained to score the identified performance metrics during a conforming period may be calibrated using the determined relationship (e.g., proportionality). The relationship may be re-determined as needed during the calibration period, and the calibration may be adjusted accordingly in response thereto. In this way, an existing, trained machine learning model may be used seamlessly between a conforming period and a calibration period, throughout the calibration period, and without requiring an estimation, simulation, or other prediction regarding a number or nature of events that may or may not occur during the calibration period.

In more detail, described techniques use artificial intelligence or machine learning to process existing training data (e.g., relevant historical data) and construct one or more performance models. Then, the trained performance models may be used to score measured or detected values of performance metrics, to obtain a performance characterization of individual, or groups or combinations of, performance metrics. In this way, standardized scores may be assigned within the performance characterization. A real-time system performance may be tracked, and predictions may be made as to whether and when corrective actions may be necessary.

For example, some performance metrics may include performance metrics commonly referred to as key performance indicators, or KPIs. The term KPI should be understood broadly to represent or include any measurable value that can be used to indicate a past, present, or future condition, or enable an inference of a past, present, or future condition, with respect to a measured context (including, e.g., the example contexts referenced below). KPIs are often selected and defined with respect to an intended goal or objective, such as maintaining an operational status of a network, or providing a desired level of service to a user. For example, KPIs may include a percentage of central processing unit (CPU) resources in use at a given time, an amount of memory in use, and data transfer rates or volumes between system components. A given system may have hundreds or even thousands of KPIs that measure a wide range of performance aspects. Consequently, the various KPIs may, for example, have values that are measured using different scales, ranges, thresholds, and/or units of measurement.

As referenced above, one or more machine learning models may be trained to account for these and other factors and to assign a score to a current value(s) of a specific KPI or group of KPIs. Individually or in the aggregate, these scores may be used to provide a performance characterization of a system, a technology landscape, or a portion(s) thereof. Moreover, the scores may be defined with respect to a scale, range, threshold(s), and/or unit of measurement that may be commonly defined across all KPIs. As a result, it is straightforward to assess and otherwise utilize the resulting scores, even for a large number of KPIs.

As also referenced above, scoring of such machine learning models (performance models) may be affected by, e.g., external events, situations, or contexts, such as events occurring on a particular calendar day (sometimes referred to herein as "special days"). Techniques described herein minimize or eliminate the effects of such special days on scoring abilities of trained performance models, and thus provide maximum available visibility into a status of the overall technology landscape during time periods that may be critical to a success of an underlying business, even when no relevant training data is available.

FIG. 1 is a block diagram of a monitoring system 100 with short-term model calibration for technology landscapes. In FIG. 1, a model calibrator 102 facilitates and provides performance characterization of a technology landscape 104, using performance metrics 106.

In FIG. 1, the technology landscape 104 may represent any suitable source of performance metrics 106 that may be processed for predictions using the system 100. For example, in some embodiments the technology landscape 104 may represent a mainframe computing environment, or any computing landscape of an enterprise or organization conducting network-based business transactions. The technology landscape 104, however, is not limited to such environments. For example, the technology landscape 104 may include many types of network environments, such as network administration for a private network of an enterprise. Technology landscape 104 may also represent scenarios in which sensors, such as internet of things devices (IoT), are used to monitor environmental conditions and report on corresponding status information (e.g., with respect to patients in a healthcare setting, working conditions of manufacturing equipment or other types of machinery, in many other industrial settings (including the oil, gas, or energy industry), or working conditions of banking equipment, such as automated transaction machines (ATMs)). In some cases, the technology landscape 104 may include, or reference, an individual computing component, such as a laptop or desktop computer.

The performance metrics 106 may thus represent any corresponding type(s) of data that is captured and reported, particularly in an ongoing, dynamic fashion, and for a potentially large number of performance metrics. For example, in a setting of online sales or other business transactions, the performance metrics 106 may characterize a condition of many servers being used. In a healthcare setting, the performance metrics 106 may characterize either a condition of patients being monitored, or a condition of IoT sensors being used to perform such monitoring. Similarly, the performance metrics 106 may characterize machines being monitored, or IoT sensors performing such monitoring, in manufacturing, industrial, energy, or financial settings.

In many of the examples below, which may occur in mainframe or networking environments, the performance metrics 106 may be referred to, or include, KPIs.

In some example implementations, the performance metrics 106 may represent or include a large repository of stored data. The system 100 may be instrumental in analyzing such data in a highly fast, efficient, customized, and reliable manner, as described herein.

In many implementations, however, the performance metrics 106 represent a real-time or near real-time data stream that is frequently or constantly being received with respect to the technology landscape 104. For example, the performance metrics 106 may be considered to be received within defined time windows, such as every second, every minute, or every hour.

In FIG. 1, a metric monitor 108 receives the performance metrics 106 over time, e.g., in real time. The performance metrics 106 may be monitored in a manner that is particular to the type of underlying resource being monitored. For example, received values (and value ranges) and associated units of measurement may vary widely, depending on whether, for example, an underlying resource includes processing resources, memory resources, or network resources (e.g., related to network bandwidth, or latency).

Additionally, as referenced above, all such values of performance metrics 106 may vary over time, based on a large number of factors. For example, performance metric values may vary based on time of day, time of week, or time of year. Performance metric values may vary based on many other contextual factors, such as underlying operations of a business or other organization deploying the technology landscape 104.

In order to capture and account for such factors, while still providing accurate performance characterizations, a performance characterization generator 110 may use one or more trained machine learning models, represented in FIG. 1 as being stored using a model store 112. A score generator 114 may then score the various performance metric values received through the metric monitor 108, to obtain standardized performance characterizations that are easily interpretable by administrators and other users, and that may be used in conjunction with one another to provide a multivariate analysis of desired aspects of the technology landscape 104.

For example, in some scoring systems threshold values are set such that scores above/below zero within a first threshold(s) (e.g., from −1.5 to 1.5 in a first approach, or from −3.0 to 3.0 in a second approach) are considered "green," or acceptable, scores outside of the first threshold but within a second threshold(s) (e.g., from −3.0 to −1.5 and from 1.5 to 3.0 in the first approach, or from −6 to −3 and from 3 to 6 in the second approach), are considered "yellow," or cautionary, and scores outside of the second threshold(s) (e.g., less than −3 or more than 3 in the first approach, or less than −6 or more than 6 in the second approach) are considered "red" or anomalous. In similar scoring schemes, other thresholds may be set. For example, an outer ("red") range may be set as less than −3.0 or more than 3.0, or less than −1.5 or more than 1.5.

In additional or alternative scoring schemes, performance metric values may be normalized for scoring between 0 and 100 (or some other minimum/maximum value), where either 0 or 100 may be selected as an optimal value. Then, ranges within the 0 to 100 range may be designated as stable, warning, or critical.

These approaches are merely examples, and, as described herein, other scoring values, ranges, and thresholds may be set. Moreover, within each such scoring system, a configuration handler 116 may be provided, which enables an administrator or other user to designate or otherwise configure sensitivities or other aspects of the scores provided by the score generator 114. For example, a provider of the performance characterization generator 110 may specify default values, thresholds, or ranges, but the configuration handler 116 may provide a user with an ability to modify these defaults in a desired manner. The configuration handler 116 may also be used to configure aspects of operations of the model calibrator 102, as referenced in various examples, below.

A graphical user interface (GUI) generator 118 may be configured to generate any suitable GUI that displays a performance characterization in a desired manner. Specific examples of such GUIs are included below, e.g., with respect to FIGS. 5-7. In general, however, a generated GUI may display any specified performance metrics, or groups or combinations thereof. A generated GUI may display time periods during which performance metrics were captured or scored. A generated GUI may display specific systems or subsystems of the technology landscape 104 that are scored.

A generated GUI may display many other performance characterizations that are not discussed here in detail. For example, a generated GUI may characterize scoring trends over time of one or more performance metric scores, e.g., as a way of predicting a future malfunction.

In specific examples described herein and related to operations of the model calibrator 102, the GUI generator 118 may be configured to generate one or more GUIs that display performance characterizations that appear in a consistent manner to users across both conforming periods and non-conforming, calibration periods. For example, during conforming periods, the GUI generator 118 may display scores provided by the score generator 114 for many different KPIs or groups of KPIs, within specified ranges, and using various graphical displays to indicate a system status in conjunction with the scores.

For example, as referenced above, scores between −1.5 and 1.5 may be displayed as green, scores from −3.0 to −1.5 and 1.5 to 3.0 may be displayed in yellow, and scores below −3.0 or above 3.0 may be displayed in red. In these and other examples, a scoring and display scheme being used may be maintained across both conforming periods and calibration periods, so as to provide consistency and ease of use for users, even when the GUI generator 118 is required to reflect calibration operations of the model calibrator 102.

For example, as referenced above, values of performance metrics 106 may be significantly different during a calibration period than during a conforming period, so that an uncalibrated output of the score generator 114 may also be significantly different than expected with respect to the scoring ranges just mentioned. As described in detail below, the model calibrator 102 may be configured to shift scoring thresholds of the score generator to reflect changes in the value of the performance metrics 106, or may be configured to input adjusted performance metric values into the score generator 114, in order to obtain meaningful scores during a calibration period. Even with such underlying calibrations, the GUI generator 118 may be configured to continue to output scores and associated display (e.g., color) schemes in a manner(s) that is consistent with display techniques used during conforming periods.

The GUI generator 118 also may be configured to display additional screens that are accessible by, and for the use of, system administrators responsible for overseeing operations of the model calibrator 102. For example, such additional displays may illustrate actual underlying performance metric values and/or associated, uncalibrated scores, or various other displays used to assist in management and configuration of the model calibrator 102.

In example implementations, the model calibrator 102 may include a calibration trigger handler 120, which may be configured to determine an initiation of a calibration period, following a conforming period. A calibration period may be open-ended (e.g., may be ended only when the model calibrator 102 determines that scoring calibration is no longer required), or may be closed, such as at the end of a specific calendar date. For example, a calibration period may be detected in response to occurrence of a calendar date (e.g., Black Friday), and may automatically end at the end of that day/date. In other examples, a calibration period may be determined in response to detected values and/or scores of the performance metrics 106, and may be extended until (i.e., may only be ended when) the detected values and/or scores no longer indicate a need for calibration.

For example, the performance characterization generator 110 may be configured to detect false positive scores. For example, a false positive indicator may be detected when an unusually high (threshold) number or percentage of KPI scores are outside of normal ranges, or outside of normal ranges by a threshold amount. False positive indicators may also be received from system administrators when systems are running normally or otherwise incompatible with reported scoring alerts.

Once detected, a metric selector 122 may identify and select calibratable performance metrics of the performance metrics 106. For example, not all performance metrics 106 may be suitable for direct scoring calibration, while others may be calibrated in a highly accurate and reliable manner.

For example, a calibratable performance metric may include a workload metric associated with program logic of an application running in the technology landscape 104. Such applications and associated program logic may be associated with operations (e.g., database access transactions) that scale with respect to typical use case scenarios of the technology landscape 104.

For example, the technology landscape 104 may be associated with a bank or a retail sales organization. The technology landscape 104 may be constructed and configured to support corresponding applications used by customers. For example, in a retail sales scenario, applications may include supporting a purchase and checkout/payment procedure. Such applications may require known types and amounts of operations within the technology landscape 104, such as updating an inventory and its associated database access operations.

During calibration periods, for such calibratable performance metrics, such operations may scale proportionately in conjunction with greater or lesser use of the technology landscape 104. For example, during Black Friday, such operations may increase to a large extent as large numbers of customers conduct sales transactions, and may do so in a largely proportional manner since each atomic sales transaction is similar in terms of its impact on the technology landscape 104. In another example, during a holiday (e.g., Thanksgiving or Christmas), such operations may decrease to a large extent. Again, such decreases may correspond with proportional decreases in usage of resources monitored by the calibratable performance metrics of the performance metrics 106.

For these and other reasons, a relationship detector 123 may be configured to determine a relationship between values of the calibratable performance metrics, during a conforming period, and corresponding values of the calibratable performance metrics, during the detected calibration period. Then, a threshold adjuster 124 may be configured to adjust, i.e., calibrate, scores provided by the score generator 114 and/or performance characterizations provided by the GUI generator 118.

For example, the detected relationship may be a ratio of calibratable performance metric values during the calibration period to corresponding (e.g., same) performance metric values during a selected conforming period. The selected conforming period may be determined from a most-recent applicable conforming period or from data for one or more model-conforming periods maintained for purposes of calibration.

For example, when scoring for Black Friday, a conforming period may be defined as a preceding Friday or time of day on the preceding Friday or as some earlier time period for which conforming values were saved. Then, the relationship detector 123 may determine a ratio of scores at corresponding (e.g., same) days or times of day of the conforming period data and the detected calibration period data.

As described in more detail, below, the threshold adjuster 124 may be configured to enable score calibration by the score generator 114 using a variety of techniques. For example, the threshold adjuster 124 may use a ratio determined by the relationship detector 123 to modify detected values of the calibratable performance metrics, which may then be provided to the score generator 114. In other examples, the detected values of the calibratable performance metrics may be fed directly into the score generator 114 to obtain uncalibrated scores, which may then be adjusted to obtain calibrated scores.

In some examples, operations of the relationship detector 123 and the threshold adjuster 124 may be performed dynamically and continuously during a calibration period, e.g., at defined intervals and/or in response to detected calibration triggers determined by the calibration trigger handler 120. Thus, during a calibration period, when calibrating the type of time-series models described herein, a first calibration level implemented at a first point in time (e.g., a factor of 5 increase of a specific transaction rate, initiated at 9:00 AM) may be continuously applied until a second calibration level is determined and implemented at a second point in time (e.g., changing to a factor of 4.5 increase of the transaction rate, initiated at 9:15 AM). Calibration may continue until the end of a calibration period, such as at the end of a designated day, date, or time of day, or when a calibration completion trigger is detected.

Conforming periods are defined as time periods during which the performance metrics 106 generally conform (e.g., with respect to value, variation, and patterns of changes) to training data 126 use by a training engine 125 to train performance characterization models within the model store 112. Multiple such models may be generated, trained, parametrized, and stored using the model store 112, with each such model corresponding to known time periods and/or other conditions.

For example, a first model for the technology landscape 104 may be trained with respect to training data 126 captured during weekend operations, while a second model may be trained using training data 126 from weekday operations. In contrast with the calibration periods described herein, such defined time periods may have corresponding scoring patterns that are detectable by, and usable by, the training engine 125, with respect to training corresponding performance characterization models.

In FIG. 1, the model calibrator 102 is illustrated as being implemented using at least one computing device 128, including at least one processor 130, and a non-transitory computer-readable storage medium 132. That is, the non-transitory computer-readable storage medium 132 may store instructions that, when executed by the at least one processor 130, cause the at least one computing device 128 to provide the functionalities of the model calibrator 102, and related functionalities.

For example, the at least one computing device 128 may represent one or more servers. For example, the at least one computing device 128 may be implemented as two or more servers in communications with one another over a network. Accordingly, the model calibrator 102, the performance characterization generator 110 and the training engine 125 may be implemented using separate devices in communication with one another. In other implementations, however, although the model calibrator 102 is illustrated separately from the performance characterization generator 110, it will be appreciated that some or all of the respective functionalities of either the model calibrator 102 and the performance characterization generator 110 may be implemented partially or completely in the other, or in both.

Figure 2:
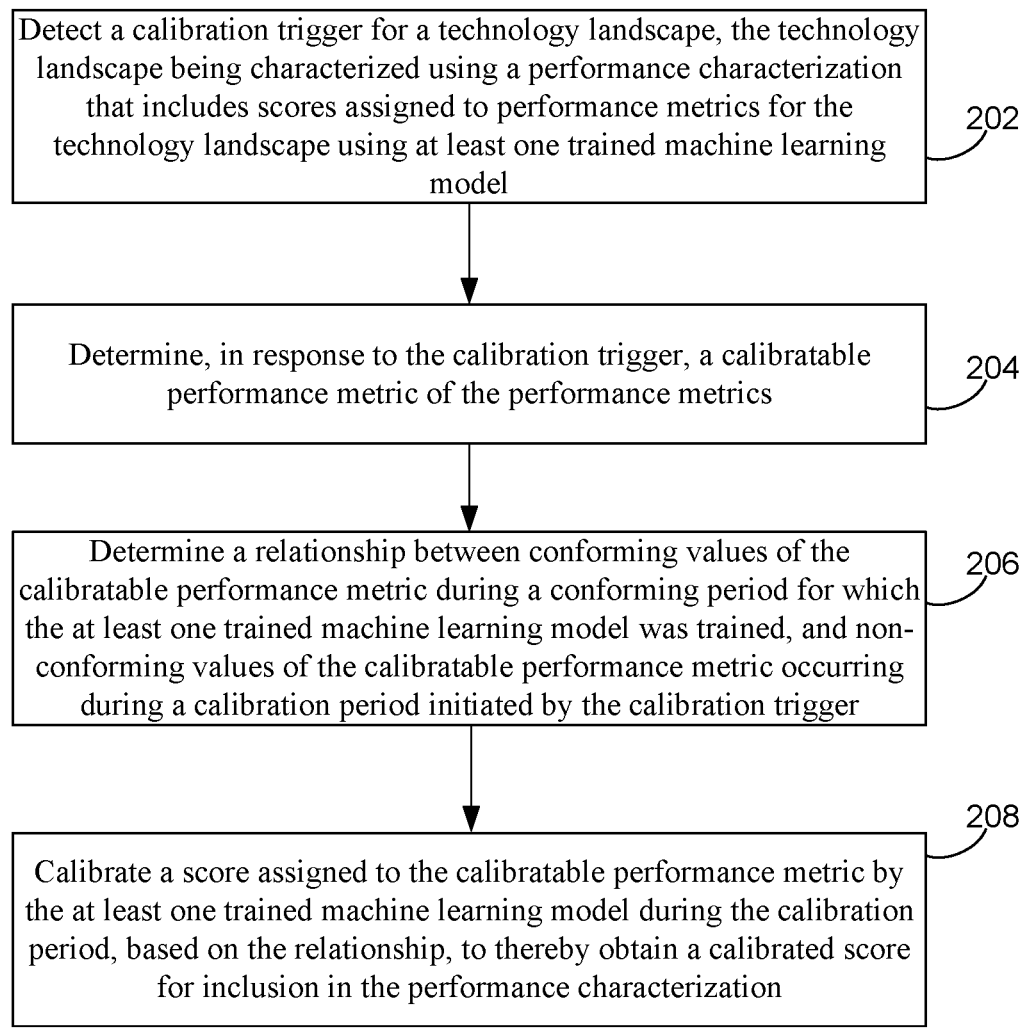
FIG. 2 is a flowchart illustrating example operations of the monitoring system of FIG. 1.

FIG. 2 is a flowchart illustrating example operations of the system of FIG. 1. In the example of FIG. 2, operations 202-208 are illustrated as separate, sequential operations. In various implementations, the operations 202-208 may include sub-operations, may be performed in a different order, may include alternative or additional operations, or may omit one or more operations. Further, in all such implementations, included operations may be performed in an iterative, looped, nested, or branched fashion.

In the example of FIG. 2, a calibration trigger for a technology landscape may be detected, the technology landscape being characterized using a performance characterization that includes scores assigned to performance metrics for the technology landscape and using at least one trained machine learning model (202). For example, the calibration trigger handler 120 of the model calibrator 102 may be configured to receive a calendar notification, an indication from an administrator, or a violation of a false positive threshold, as referenced above.

In response to the calibration trigger, a calibratable performance metric of the performance metrics may be determined (204). The system of FIG. 1 may monitor thousands of performance metrics 106, and the metric selector 122 may be configured to select one or more of these for calibration using the techniques described herein. In various implementations, individual ones (or groups of) the performance metrics 106 may be pre-classified with respect to calibration compatibility, so that the metric selector 122 only needs to select designated performance metrics based on such classifications in response to the detected calibration trigger. In some implementations, two or more performance metrics may be grouped for simultaneous or combined calibration using the techniques described herein.

A relationship may be determined between conforming values of the calibratable performance metric during a conforming period for which the at least one trained machine learning model was trained, and non-conforming values of the calibratable performance metric occurring during a calibration period initiated by the calibration trigger (206). For example, the relationship detector 123 may be configured to select or otherwise determine a suitable conforming period, which may be determined from among a plurality of conforming periods as being most relevant to the calibration period currently being initiated. In general, the conforming period may be any period of time during which at least one model of the model store 112 would otherwise be considered applicable for scoring of the performance metrics 106.

A score assigned to the calibratable performance metric by the at least one trained machine learning model during the calibration period may be calibrated, based on the relationship, to thereby obtain a calibrated score for inclusion in the performance characterization (208). For example, the threshold adjuster 124 may provide the score generator 114 with performance metric values that are adjusted by an amount determined from the relationship, so that resulting scores are output using the same range as used during the conforming period.

In other examples, the threshold adjuster 124 may provide the score generator 114 with an adjusted "zero value," around which warning ranges are centered. For example, as referenced above and described in detail below with respect to FIGS. 6 and 7, threshold values may be set such that scores above/below zero within a first threshold(s) (e.g., from −1.5 to 1.5) are considered "green," scores outside of the first threshold but within a second threshold(s) (e.g., from −3.0 to −1.5 and from 1.5 to 3.0), are considered "yellow," and scores outside of the second threshold(s) (e.g., less than −3 or more than 3) are considered "red" or anomalous.

In such cases, the threshold adjuster 124 may determine from the relationship detected by the relationship detector 123 that the relevant zero value should be adjusted to a value of 20 within the relevant scoring system. Then, for example, threshold values may be set such that scores above/below 20 within a first threshold(s) (e.g., from 18.5 to 21.5) are considered "green," scores outside of the first threshold but within a second threshold(s) (e.g., from 17.0 to 18.5 and from 21.5 to 23.0), are considered "yellow," and scores outside of the second threshold(s) (e.g., less than 17 or more than 23) are considered "red" or anomalous.

As referenced, the GUI generator 118 may be configured to generate at least some of the resulting displays in a manner that hides the above calibrations, so that a user only sees the same displays as typically available during a conforming period. In other examples, the GUI generator 118 may be configured to display the larger threshold or zero value determined by the threshold adjuster 124, and associated scores within defined ranges thereof, to reflect and demonstrate differences occurring as a result of the calibration period (e.g., during a special day).

Figure 3:
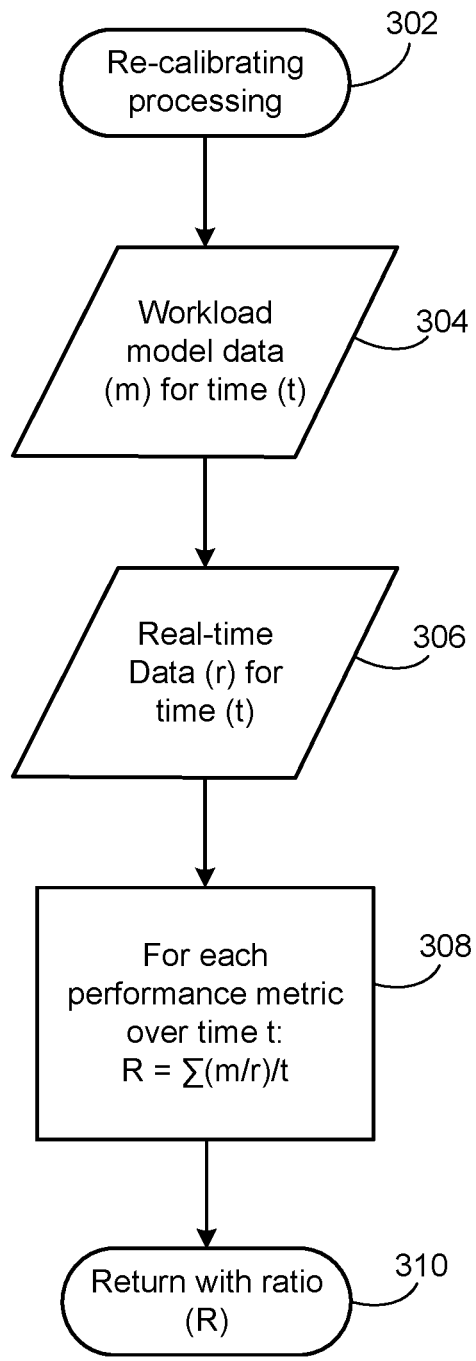
FIG. 3 is a flowchart illustrating example operations of the monitoring system of FIG. 1 for calculating a calibration ratio.

FIG. 3 is a flowchart illustrating example operations of the monitoring system 100 of FIG. 1 for calculating a calibration ratio. More specifically, FIG. 3 illustrates examples in which a calibration ratio is determined as a lagging indicator over a period of time. That is, for example, during a special day or other calibration period, a relationship determined by the relationship detector 123, such as a calibration ratio, may change over time. For example, during a special day, shopping activities may peak at a certain time of the day. Consequently, re-calibration processing (302) may be needed to update the calculated calibration ratio and associated scoring calibrations performed by the score generator 114.

For example, for a first time period t of a conforming period, workload model data m may be determined (304). Real-time data r may also be determined for the time period t (306). For example, for the example of Black Friday, the time period may be a certain time of day, so that the data "m" represents metric values for that time of day during a conforming day, while the data "r" represents the corresponding, actual metric values being collected for that time of day on the Black Friday values being scored.

Then, for each performance metric (e.g., KPI) over the time "t," a value R=Σ(m/r)/t may be calculated (308) and returned as a calibration ratio (310). As referenced above, and described below with respect to FIG. 4, the re-calibration processing of FIG. 3 may be implemented in an ongoing basis to ensure scoring accuracy during an entirety of a calibration period.

Figure 4:
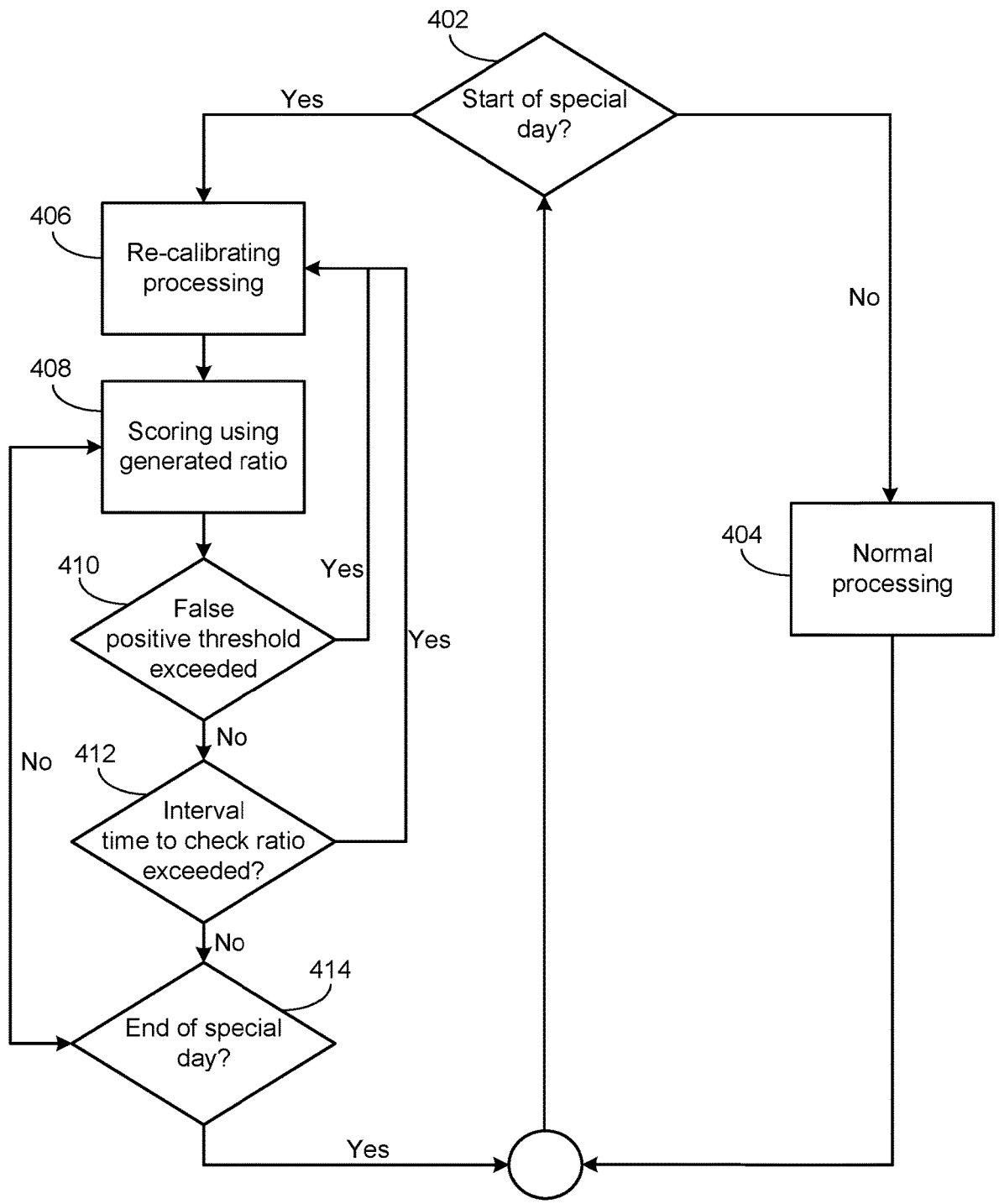
FIG. 4 is a flowchart illustrating example operations of the monitoring system of FIG. 1 during scoring calibrations.

Specifically, FIG. 4 is a flowchart illustrating example operations of the monitoring system 100 of FIG. 1 for performing multiple calibration procedures during a calibration period. As shown in FIG. 4 and continuing the example above in FIG. 3 in which a calibration period is triggered as a special day, then calibration processing may begin at the start of a relevant special day (402). As also shown, on days that are not designated as special days, normal processing (404) may proceed, using the performance characterization generator 110 of FIG. 1 without any calibration of resulting scores.

Otherwise, the special day begins with the re-calibration processing of FIG. 3 (406). Then, scoring of received performance metric values, using the calculated ratio R, may proceed as described herein (408) and as illustrated below with respect to the examples of FIGS. 6 and 7.

If a false positive threshold is exceeded (410) at any time, then the re-calibration processing of FIG. 3 may be initiated again (406), followed by calibrated scoring using generated ratio (408). If the false positive threshold is not exceeded (410), but an interval time to check the ratio is reached or exceeded (412), then the re-calibration processing of FIG. 3 may be initiated (406), followed by calibrated scoring using generated ratio (408). In this way, an accuracy of calibrated scoring may be maintained until the end of the special day is reached (414).

More generally, it may occur that the calibration processes of FIGS. 3 and 4 may occur independently of a pre-defined, expected, or predicted day, but may be implemented in response to a calibration trigger that may be associated with a calibration period that does not have a known end point.

In such cases, the model calibrator 102 may extend the calibration period on an as-needed basis. For example, after detecting a calibration trigger and performing subsequent calibrations, the model calibrator 102 may detect a subsequent calibration trigger that extends the calibration period. A subsequent calibration trigger may include the type of false positive threshold referenced above.

The model calibrator 102 may then detect an updated relationship (e.g., ratio) between conforming values and non-conforming values of a calibratable performance metric. Accordingly, the model calibrator 102 may calibrate an updated score assigned to the calibratable performance metric by at least one trained machine learning model during the extended calibration period, based on the updated relationship, to obtain an updated calibrated score for inclusion in the performance characterization. This process may continue until no need for further calibration is detected.

Figure 5:
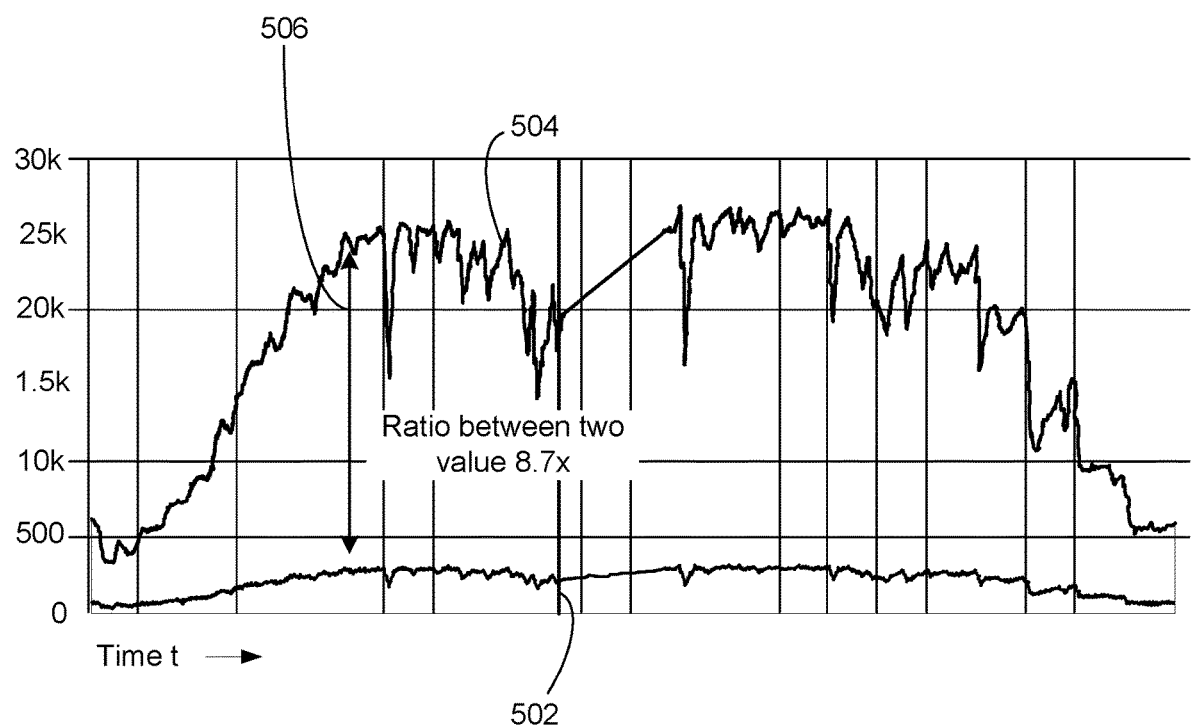
FIG. 5 is a first screenshot illustrating an example of relationship determination using the monitoring system of FIG. 1.

FIG. 5 is a first screenshot illustrating an example of relationship determination using the monitoring system 100 of FIG. 1. In the example of FIG. 5, values for a specific, calibratable performance metric are illustrated. Specifically, line 502 illustrates monitored values during a conforming period, while line 504 illustrates monitored values for the same calibratable performance metric during a calibration period.

Line 506 indicates a ratio taken at a specific time between the lines 504 and 502, which, in the non-limiting example of FIG. 5, is illustrated as having a value of 8.7. Of course, any actual ratio or other relationship between the lines 504, 502 may be determined, based on detected performance metric values. Moreover, although illustrated at a single time tin FIG. 5, it will be appreciated from the above, e.g., from the discussion of FIG. 3, that the ratio may be determined over a period of time, using average performance metric values during the selected period of time or using any other suitable relationship detection technique.

Figure 6:
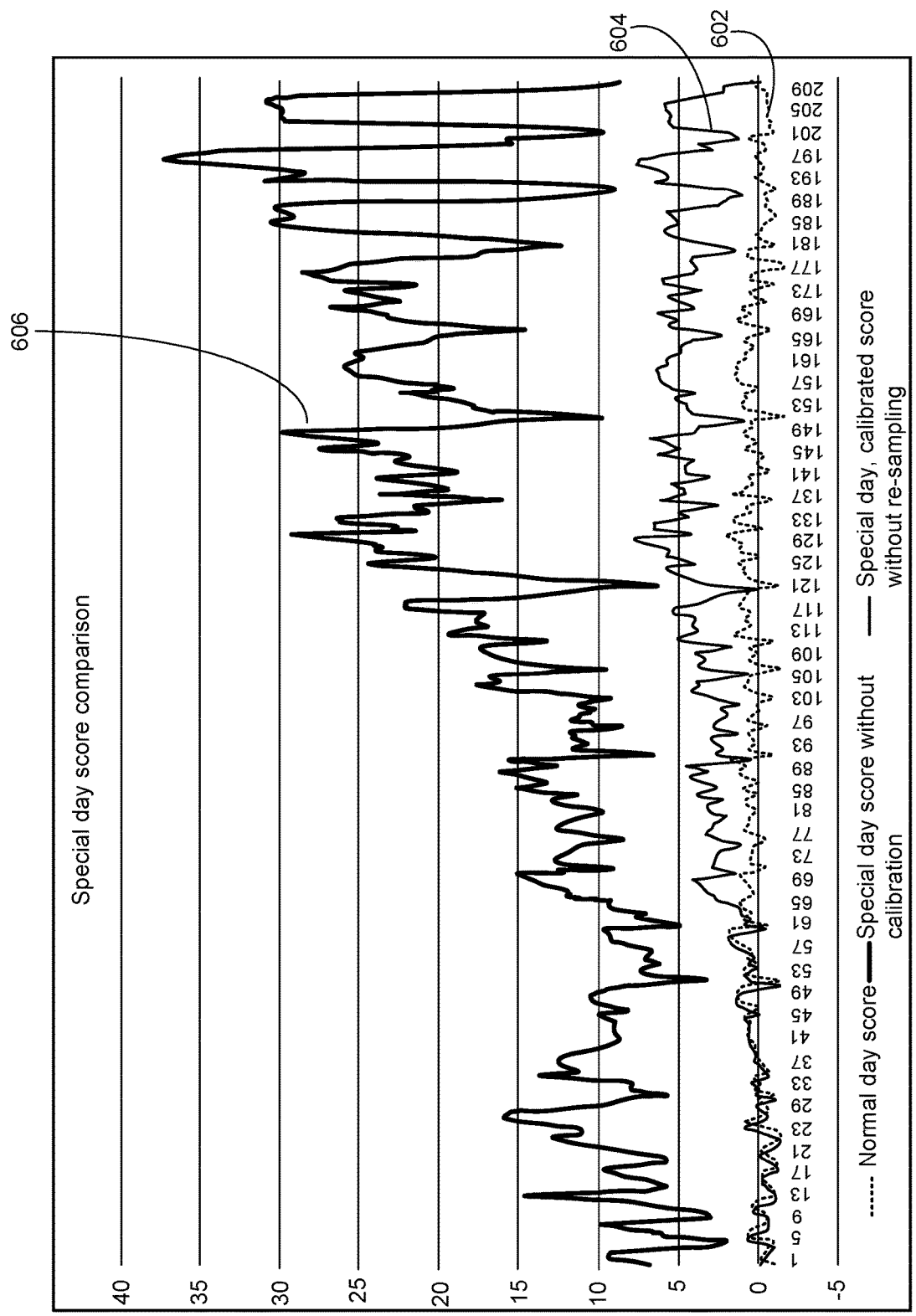
FIG. 6 is a second screenshot illustrating a first example of scoring calibration using the monitoring system of FIG. 1.

FIG. 6 is a second screenshot illustrating a first example of scoring calibration using the monitoring system 100 of FIG. 1. FIG. 6 illustrates scores generated by the score generator 114 using a trained model from the model store 112, which may correspond to the example performance metric values of FIG. 5 or other performance metric values.

In FIG. 6, a line 602 illustrates scores determined for a normal day, referred to herein as a conforming period. For example, the line 602 may illustrate scores calculated for the line 502 of FIG. 5.

The line 604 illustrates a calibrated score, provided in this example without the re-calibration processing of FIGS. 3 and 4. As a result, as shown, the line 602 initially closely tracks the line 602, but eventually demonstrates increasingly greater variation therefrom as the special day proceeds.

Finally, in FIG. 6, a line 606 illustrates, for the sake of comparison, completely uncalibrated scores provided by the score generator 114 during the special day. That is, the line 606 corresponds to scores for the line 504 of FIG. 5, without any calibration. As shown, the uncalibrated scores provided by the line 606 are all well outside the normal, expected scoring ranges, and would be essentially useless without the calibration techniques described herein.

Figure 7:
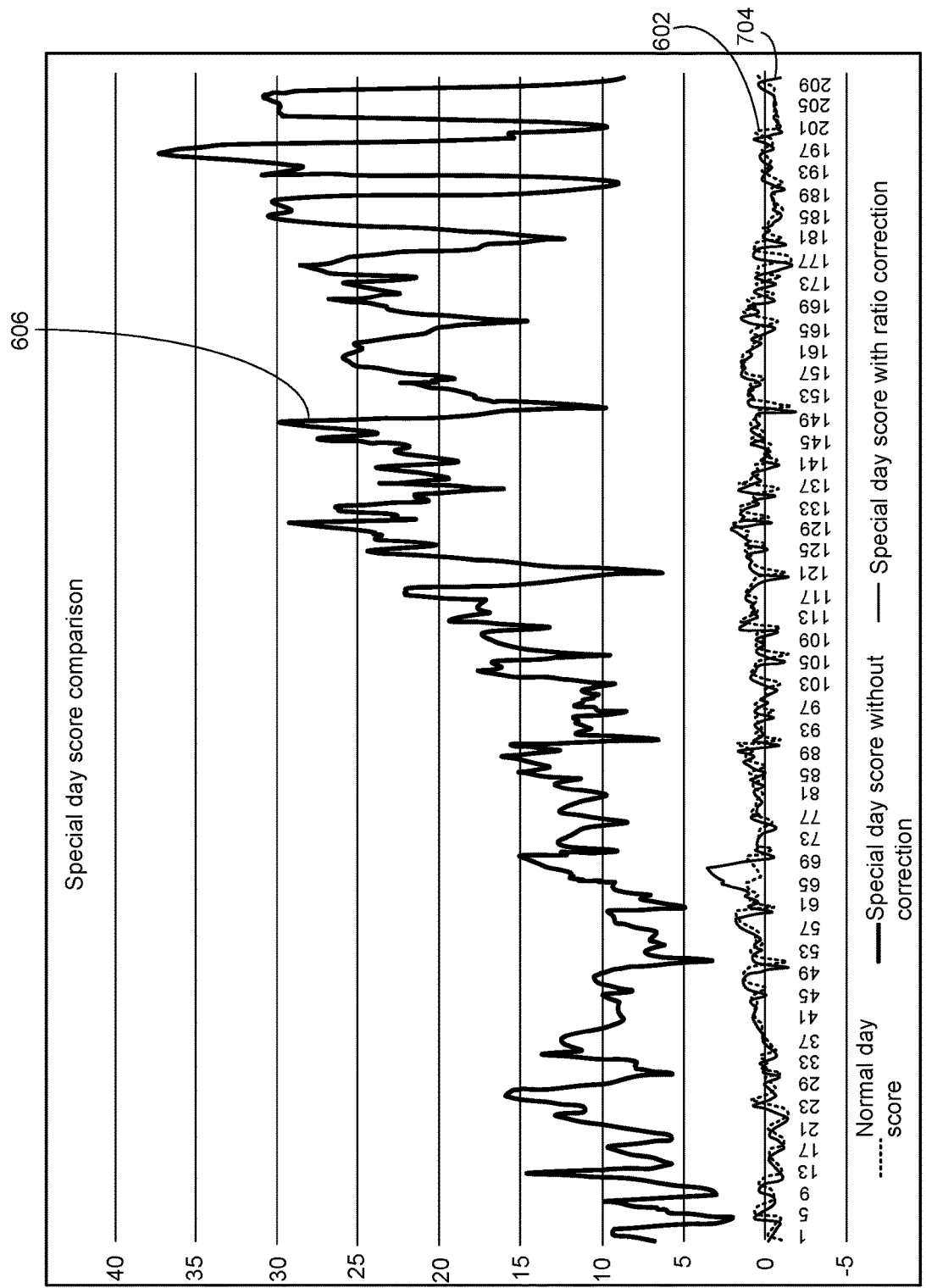
FIG. 7 is a third screenshot illustrating a second example of scoring calibration using the monitoring system of FIG. 1.

FIG. 7 is a third screenshot illustrating a second example of scoring calibration using the monitoring system 100 of FIG. 1. FIG. 7 illustrates the lines 602 and 606 of FIG. 6, but the line 604 is replaced by line 704, which illustrates an impact of performing the dynamic calibration process of FIG. 4.

That is, the line 704 illustrates calibrated scoring that is re-calibrated and corrected as described in FIG. 4, so that the ratio of FIG. 5 is recalculated each time that a false positive threshold is exceeded or when a designated time interval within the calibration period is met. In other words, the re-calibration occurs with a minimum frequency that is set by the designated time interval, but can also occur more frequently, as needed.

Although many of the above examples describe scenarios in which calibration periods (e.g., special days) have increased values for performance metrics 106, it may also occur that calibration periods have reduced values for performance metrics 106. For example, a banking holiday or other holiday may be associated with reduced sales volumes for businesses and corresponding reductions in performance metric values. In such cases, the relationship determined by the relationship detector 123 may include a ratio that is less than 1, and a corresponding scoring threshold may be reduced (e.g., shifted down) rather than increased (shifted up).

Thus, described techniques enable useful predictive monitoring, even on special days, because an automatic re-calibration is used to allow monitoring to continue. Specifically, as described, when a machine learning application is triggered into special-day mode by a calendar event, current learned metrics may be used to assess the difference in workload metrics that can be used as a constant ratio, such as workload-related metrics that are typically used as application related metrics.

This ratio may be calculated by using a period of time at the start of a special day. The ratio may then be applied to a calibration of the rest of multivariant metrics in use by shifting threshold sensitivity. For example, a score of 1.5 to trigger an abnormal condition may now need a z score of 7.9 to give an abnormal condition. The dynamic calibration provides more realistic and accurate results than are available with conventional techniques. As also described, throughout a special day or other calibration period, the ratio may be recalculated, based on monitoring the effectiveness of the ratio. Recalibration can be initiated either on a time-based cadence or when a tolerance threshold is exceeded.

For example, input data may be sampled, and a ratio between normal and special-day values may be calculated. Throughout the special day, that ratio may be used to determine what the value should be compared to the actual real-time data on the special day. Normally, workload values, when looked over a period of several days, constitute a sine wave. Rising and falling edges of oscillation are used in a ratio calculation and continual correction may thus be applied to provide optimum ratios.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   detect a calibration trigger for a technology landscape, the technology landscape being characterized using a performance characterization that includes scores assigned to performance metrics for the technology landscape and using at least one trained machine learning model;
   determine, in response to the calibration trigger, a calibratable performance metric of the performance metrics;
   determine a relationship between conforming values of the calibratable performance metric during a conforming period for which the at least one trained machine learning model was trained, and non-conforming values of the calibratable performance metric occurring during a calibration period initiated by the calibration trigger; and
   calibrate a score assigned to the calibratable performance metric by the at least one trained machine learning model during the calibration period, based on the relationship, to thereby obtain a calibrated score for inclusion in the performance characterization.

2. The computer program product of claim 1, wherein the calibration trigger includes a detection of occurrence of a calibration date.

3. The computer program product of claim 1, wherein the calibration trigger includes a detection of a violation of a false positive threshold of the scores.

4. The computer program product of claim 1, wherein the relationship includes a ratio of the non-conforming values and the conforming values.

5. The computer program product of claim 4, wherein the ratio is calculated using non-conforming values and conforming values occurring during similar times of day as one another during the calibration period and the conforming period, respectively.

6. The computer program product of claim 1, wherein the calibratable performance metric includes a workload metric associated with program logic of an application running in the technology landscape.

7. The computer program product of claim 1, wherein the instructions, when executed to calibrate the score, are further configured to cause the at least one computing device to:
   adjust a non-conforming value from among the non-conforming values to obtain an adjusted value; and
   provide the adjusted value to the at least one trained machine learning model to obtain the calibrated score.

8. The computer program product of claim 1, wherein the instructions, when executed to calibrate the score, are further configured to cause the at least one computing device to:
   determine a shifted scoring threshold for use during the calibration period, the shifted scoring threshold being related to a conforming scoring threshold used during the conforming period by a shifted amount;
   score a non-conforming value from among the non-conforming values using the at least one trained machine learning model to obtain an uncalibrated score; and
   shift the uncalibrated score by the shifted amount to obtain the calibrated score.

9. The computer program product of claim 1, wherein the instructions, when executed, are further configured to cause the at least one computing device to:
   detect a subsequent calibration trigger that extends the calibration period;
   following the subsequent calibration trigger and applicable within the extended calibration period, detect an updated relationship between the conforming values and the non-conforming values; and
   calibrate an updated score assigned to the calibratable performance metric by the at least one trained machine learning model during the extended calibration period to thereby obtain an updated calibrated score for inclusion in the performance characterization.

10. The computer program product of claim 1, wherein the instructions, when executed, are further configured to cause the at least one computing device to:
    update the relationship during the calibration period and with a minimum update frequency; and
    update the calibration of scoring the calibratable performance metric value with each update of the relationship.

11. A computer-implemented method, the method comprising:
    detecting a calibration trigger for a technology landscape, the technology landscape being characterized using a performance characterization that includes scores assigned to performance metrics for the technology landscape and using at least one trained machine learning model;
    determining, in response to the calibration trigger, a calibratable performance metric of the performance metrics;
    determining a relationship between conforming values of the calibratable performance metric during a conforming period for which the at least one trained machine learning model was trained, and non-conforming values of the calibratable performance metric occurring during a calibration period initiated by the calibration trigger; and
    calibrating a score assigned to the calibratable performance metric by the at least one trained machine learning model during the calibration period, based on the relationship, to thereby obtain a calibrated score for inclusion in the performance characterization.

12. The method of claim 11, wherein the calibration trigger includes a detection of occurrence of a calibration date.

13. The method of claim 11, wherein the calibration trigger includes a detection of a violation of a false positive threshold of the scores.

14. The method of claim 11, wherein the relationship includes a ratio of the non-conforming values and the conforming values.

15. The method of claim 14, wherein the ratio is calculated using non-conforming values and conforming values occurring during similar times of day as one another during the calibration period and the conforming period, respectively.

16. The method of claim 11, further comprising:
detecting a subsequent calibration trigger that extends the calibration period;
following the subsequent calibration trigger and applicable within the extended calibration period, detecting an updated relationship between the conforming values and the non-conforming values; and
calibrating an updated score assigned to the calibratable performance metric by the at least one trained machine learning model during the extended calibration period, to thereby obtain an updated calibrated score for inclusion in the performance characterization.

17. The method of claim 11, further comprising:
updating the relationship during the calibration period and with a minimum update frequency; and
updating the calibration of scoring the calibratable performance metric value with each update of the relationship.

18. A system comprising:
at least one memory including instructions; and
at least one processor that is operably coupled to the at least one memory and that is arranged and configured to execute instructions that, when executed, cause the at least one processor to
detect a calibration trigger for a technology landscape, the technology landscape being characterized using a performance characterization that includes scores assigned to performance metrics for the technology landscape and using at least one trained machine learning model;
determine, in response to the calibration trigger, a calibratable performance metric of the performance metrics;
determine a relationship between conforming values of the calibratable performance metric during a conforming period for which the at least one trained machine learning model was trained, and non-conforming values of the calibratable performance metric occurring during a calibration period initiated by the calibration trigger; and
calibrate a score assigned to the calibratable performance metric by the at least one trained machine learning model during the calibration period, based on the relationship, to thereby obtain a calibrated score for inclusion in the performance characterization.

19. The system of claim 18, wherein the instructions, when executed, are further configured to cause the at least one processor to:
detect a subsequent calibration trigger that extends the calibration period;
following the subsequent calibration trigger and applicable within the extended calibration period, detect an updated relationship between the conforming values and the non-conforming values; and
calibrate an updated score assigned to the calibratable performance metric by the at least one trained machine learning model during the extended calibration period, to thereby obtain an updated calibrated score for inclusion in the performance characterization.

20. The system of claim 18, wherein the instructions, when executed, are further configured to cause the at least one processor to:
update the relationship during the calibration period and with a minimum update frequency; and
update the calibration of scoring the calibratable performance metric value with each update of the relationship.

* * * * *